US007643087B2

(12) United States Patent
Nishimura

(10) Patent No.: US 7,643,087 B2
(45) Date of Patent: Jan. 5, 2010

(54) OPERATING BUTTON DEVICE FOR PORTABLE APPARATUS

(75) Inventor: Shinichi Nishimura, Tokyo (JP)

(73) Assignee: Hoya Corporation, Tokyo (JP)

( * ) Notice: Subject to any disclaimer, the term of this patent is extended or adjusted under 35 U.S.C. 154(b) by 876 days.

(21) Appl. No.: 10/737,817

(22) Filed: Dec. 18, 2003

(65) Prior Publication Data

US 2004/0130659 A1 Jul. 8, 2004

(30) Foreign Application Priority Data

Jan. 7, 2003 (JP) ........................... P2003-000927

(51) Int. Cl.
*H04N 5/225* (2006.01)

(52) U.S. Cl. ....................... 348/375; 348/373; 348/374; 348/376; 200/510; 200/511; 200/512

(58) Field of Classification Search ......... 348/373–376; 200/510–512
See application file for complete search history.

(56) References Cited

U.S. PATENT DOCUMENTS

| | | | | |
|---|---|---|---|---|
| 5,428,418 | A | 6/1995 | Inaba | |
| 5,461,376 | A | 10/1995 | Oono et al. | |
| 5,461,377 | A | 10/1995 | Oono et al. | |
| 5,752,117 | A | 5/1998 | Hori | |
| 6,180,905 | B1 * | 1/2001 | Pollock et al. | 200/527 |
| 6,865,342 | B2 * | 3/2005 | Hirata et al. | 396/85 |
| 2004/0051809 | A1 * | 3/2004 | Adams et al. | 348/375 |

FOREIGN PATENT DOCUMENTS

| | | | |
|---|---|---|---|
| JP | 4-324212 | A | 11/1992 |
| JP | 6-017063 | U | 3/1994 |
| JP | 11-232967 | A | 8/1999 |

OTHER PUBLICATIONS

English language Abstract of JP 4-324212 A.
English language Abstract of JP 11-232967 A.

* cited by examiner

*Primary Examiner*—Sinh Tran
*Assistant Examiner*—Anthony J Daniels
(74) *Attorney, Agent, or Firm*—Greenblum & Bernstein P.L.C.

(57) ABSTRACT

A switching device for a portable apparatus, comprises a button disposed in an opening formed in a housing. A spring member, supported by the housing, is integrally connected to a first connecting portion of the button. A stopping claw is connected to a second connecting portion of the button, and can engage with an inner wall of the housing near the peripheral edge of the opening. The switching circuit board is provided in the housing. The switching circuit board is depressed and released through the button. The switching circuit board has a notch in which the stopping claw is inserted when the button is depressed.

6 Claims, 4 Drawing Sheets

OPERATING BUTTON DEVICE FOR PORTABLE APPARATUS

BACKGROUND OF THE INVENTION

1. Field of the Invention

The present invention relates to an operating button device provided in a housing of a portable apparatus such as a digital camera.

2. Description of the Related Art

Conventionally, as an operating button device provided in a housing of a portable apparatus such as a digital camera, there is known a device, in which a button is projected from an opening formed in a housing, so that various operations can be carried out by depressing the button. A switching circuit board is provided under the button, and a projection, being able to come into contact with a switch formed on the switching circuit board, is provided on the rear surface of the button. Thus, by depressing the button, the switch is pressed, so that turning ON and turning OFF operations are performed.

The button is connected to a spring member, and is always urged in a direction in which the button is projected from the opening. A flange is formed over the outer periphery of the button, and is engaged with a peripheral edge of the opening in a non-operating state.

In the conventional operating button device described above, the projection, provided on the rear surface of the button, should be elongated so that the flange is prevented from interfering with the switching circuit board when the button is depressed. Therefore, a space, corresponding to the length of the projection, should be formed between the housing and the switching circuit board, and thus, there is a limit to how thin an operating button device and a housing of a portable apparatus can be.

SUMMARY OF THE INVENTION

Therefore, an object of the present invention is to provide an operating button device which is as thin as possible in order for the housing of the portable apparatus to be made as thin as possible.

According to the present invention, there is provided an operating button device for a portable apparatus having a housing formed with an opening. The operating button device comprises a button, a spring member, a stopping claw, and a switching circuit board.

The button is disposed in the opening. The button has a first connecting portion and a second connecting portion formed in a different portion from the first connecting portion. The spring member is supported by a predetermined portion of the housing. The spring member is integrally connected to the first connecting portion. The stopping claw is connected to the second connecting portion. The stopping claw can engage with an inner wall of the housing near the peripheral edge of the opening. The switching circuit board is provided in the housing. The switching circuit board is depressed and released through the button. The switching circuit board has a notch in which the stopping claw is contained when the button is depressed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
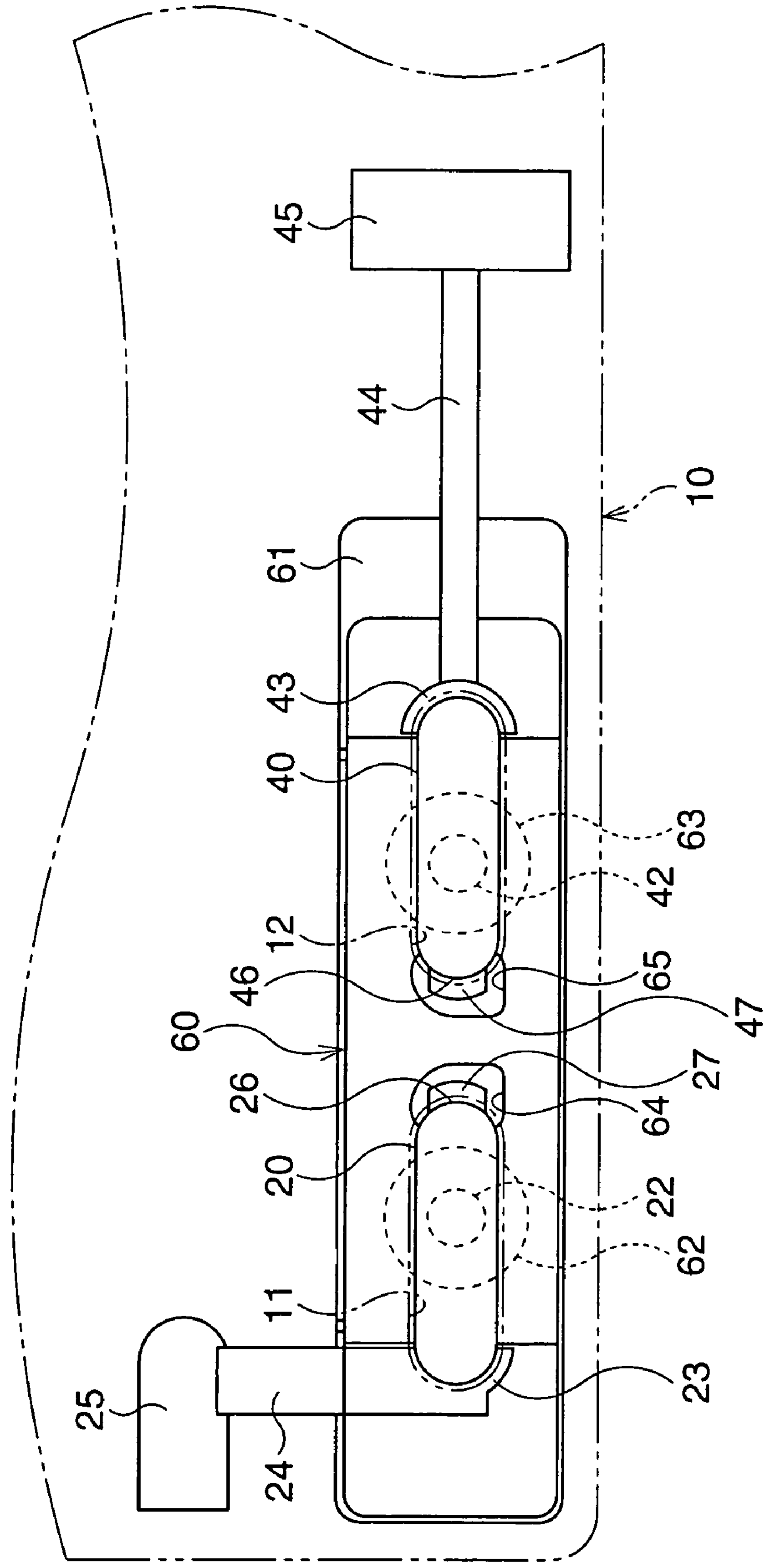
FIG. 1 is a plan view of an operating button device of an embodiment of the present invention.

The present invention will be described below with reference to the embodiments shown in the drawings.

Figure 2:
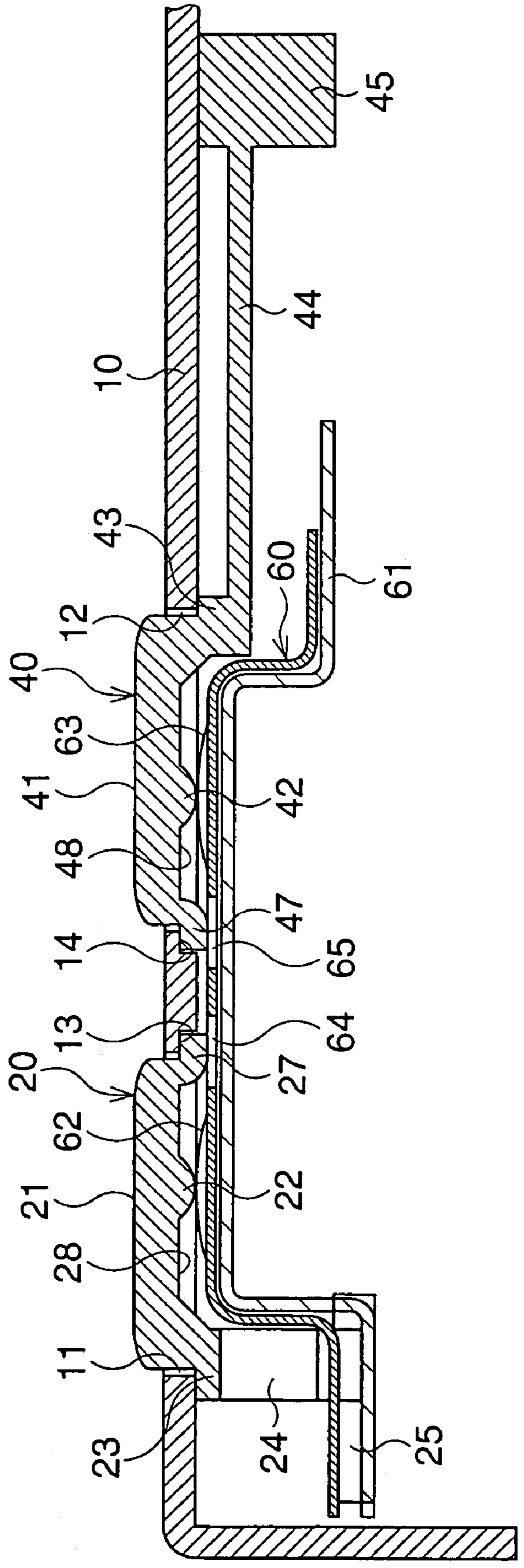
FIG. 2 is a sectional view showing a state in which the operating button device is released.
Figure 3:
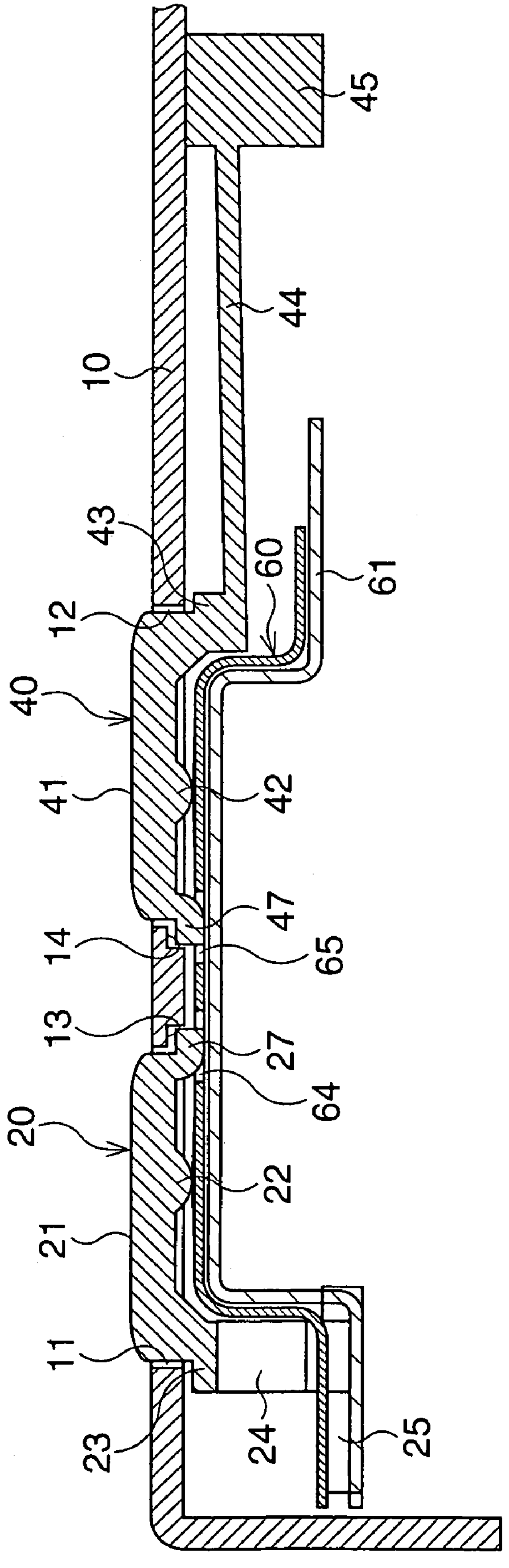
FIG. 3 is a sectional view showing a state in which the operating button device is depressed.
Figure 4:
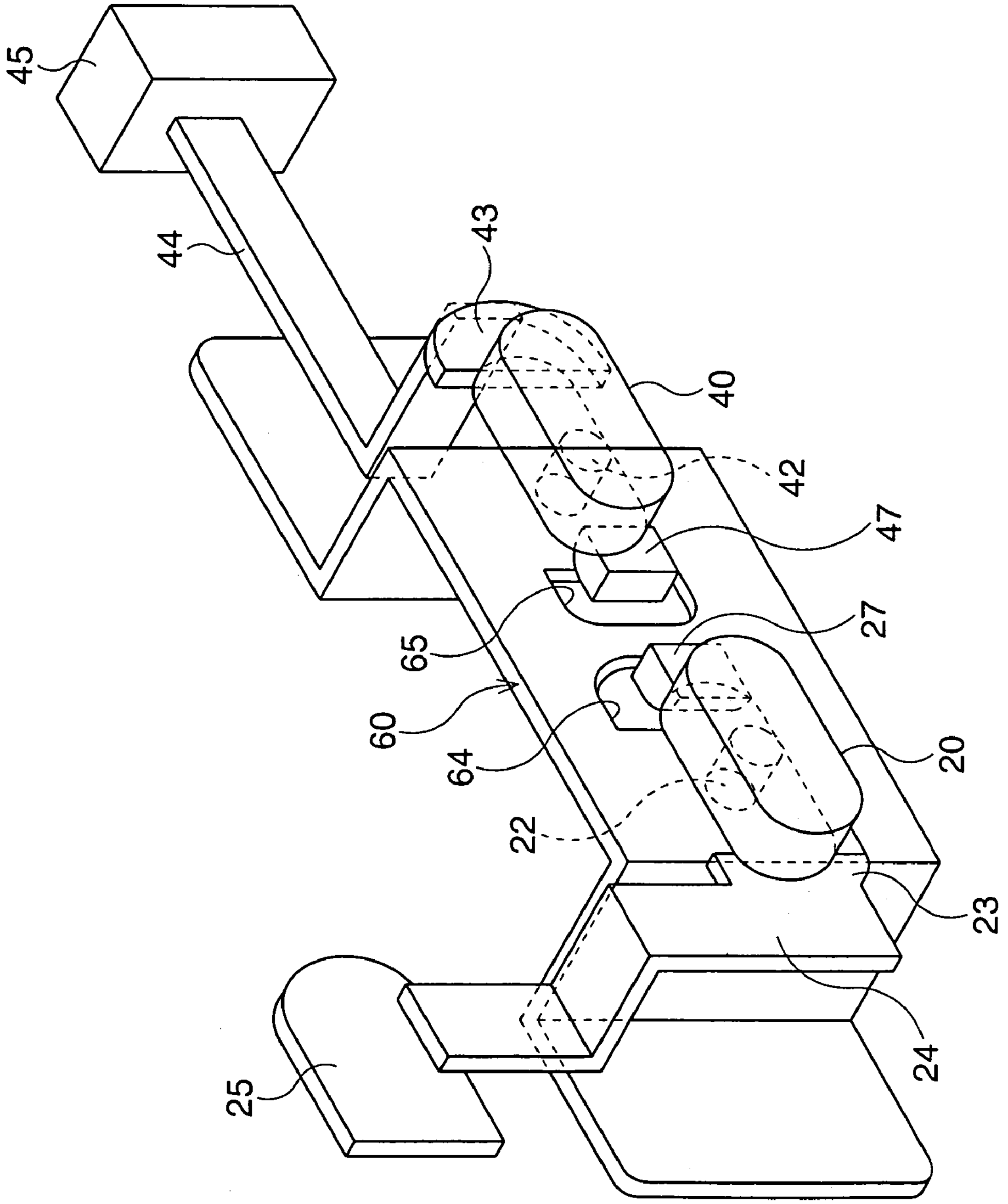
FIG. 4 is a perspective view of the operating button device.

FIG. 1 shows a plan view of an operating button device of an embodiment of the present invention. FIG. 2 is a sectional view showing a state in which the operating button device is released. FIG. 3 is a sectional view showing a state in which the operating button device is depressed. FIG. 4 is a perspective view of the operating button device. Note that, in the embodiment, the present invention is applied to a camera, such as a digital camera, which is a portable apparatus.

FIG. 1 shows only the bottom-left corner of a rear surface of the camera body, and a part of the housing 10 is indicated by the phantom line. First and second openings 11 and 12 are formed along the lower periphery of the housing 10. Each of the openings 11 and 12 has an elongated shape having two rounded ends. First and second buttons 20 and 40 are disposed in the openings 11 and 12, and are slightly smaller than those of the openings 20 and 40. Namely, each of the first and second buttons 20 and 40 also has an elongated shape having two rounded ends.

The surfaces 21 and 41 of the buttons 20 and 40 are projected from the openings 11 and 12. In the housing 10, a switching circuit board 60 is provided, which is depressed and released from being depressed through the buttons 20 and 40. The switching circuit board 60 is attached to an upper surface of a metal frame 61 provided in the housing 10, and provided with switches 62 and 63. Rear surfaces 28 and 48 are provided with projections 22 and 42 that can make contact with the switches 62 and 63.

The buttons 20 and 40 have first connecting portions 23 and 43. Each of the first connecting portions 23 and 43 is located at one of the rounded ends. Spring members 24 and 44 are integrally connected to the first connecting portions 23 and 43. The spring member 24, connected to the first button 20, is extended in a width direction of the switching circuit board 60, and is connected to a fixing portion 25 provided at a predetermined portion in the housing 10. The spring member 44, connected to the second button 40, is extended in a longitudinal direction of the switching circuit board 60, and is connected to a fixing portion 45 provided at a predetermined portion in the housing 10. The first button 20, the spring member 24, and the fixing portion 25 are formed as one body from synthetic resin. Similarly, the second button 40, the spring member 44, and the fixing portion 45 are formed as one body from synthetic resin.

Thus, the buttons 20 and 40 are formed at the free ends of the spring members 24 and 44, and are movable in the directions in which the buttons 20 and 40 project and retract, relative to the openings 11 and 12.

The buttons 20 and 40 have second connecting portions 26 and 46, each of which is formed at the other of the rounded ends. Stopping claws 27 and 47 are connected to the second connecting portions 26 and 46. Namely, the stopping claws 27 and 47 are formed at portions of the buttons 20 and 40, which are opposite to the spring members 24 and 44. The stopping claws 27 and 47 extend in opposite directions to the spring members 24 and 44. The stopping claws 27 and 47 are urged by the spring members 24 and 44, and engage with the inner wall of the housing 10 near the peripheral edges of the openings 11 and 12, when the buttons 20 and 40 are not depressed. The peripheral edges of the openings 11 and 12 have steps 13 and 14, with which the stopping claws 27 and 47 are engaged.

The switching circuit board 60 has notches 64 and 65, in which the stopping claws 27 and 47 are inserted, when the buttons 20 and 40 are depressed. The frame 61 is exposed from the notches 64 and 65. The notches 64 and 65 are large enough so that the stopping claws 27 and 47 can be inserted into them, and thus, the stopping claws 27 and 47 come into contact with the frame 61 when the buttons 20 and 40 are depressed.

The operating button device is operated as follows.

The buttons 20 and 40 are always urged by the spring members 24 and 44 in directions in which the buttons 20 and 40 are projected from the openings 11 and 12. Therefore, when the buttons 20 and 40 are not depressed, as shown in FIG. 2, the stopping claws 27 and 47 are engaged with the steps 13 and 14, and the first connecting portions 23 and 43 are engaged with the inner wall of the housing 10. Due to this, the buttons 20 and 40 rests in a state in which the surfaces 21 and 41 are projected from the housing 10 by a predetermined amount, and the projections 22 and 42 keep the switches 62 and 63 turned OFF.

Conversely, when the buttons 20 and 40 are depressed by a user, as shown in FIG. 3, the projections 22 and 42 descend against the elastic forces of the spring members 24 and 44, so that the switches 62 and 63 are turned ON. At this time, the stopping claws 27 and 47 are released from the steps 13 and 14, and enter the notches 64 and 65 of the switching circuit board 60. In this state, if the depressing forces on the buttons 20 and 40 are released, the buttons 20 and 40 return to the state shown in FIG. 2, due to the elastic forces of the spring members 24 and 44.

As shown in FIGS. 2 and 3, the projecting distances of the projections 22 and 42 toward the switching circuit board 60 are less than the projecting distances of the stopping claws 27 and 47 to the switching board 60. Namely, the projections 22 and 42 project from the rear surface 28 and 48 of the buttons 20 and 40, and the stopping claws 27 and 47 extend toward the switching circuit board-60 by a distance that is greater than the length of the projections 22 and 42. Conversely, in a conventional device, the projection extends to the switching circuit board by a distance that is greater than the length of the stopping claw. Thus, according to the embodiment, by providing the notches 64 and 65 in which the stopping claws 27 and 47 are inserted, the projecting amounts of the projections 22 and 42 are reduced. Accordingly, the operating button device can be miniaturized and the camera body can be made thinner.

Note that the shape of the buttons 20 and 40 is not limited to an elongated shape having two rounded ends, but may be circular, rectangular or any desired shape.

Further, although, in the above embodiment, the present invention is applied to a camera, the present invention can be applied to other types of portable apparatus, such as cellular telephones, and a music reproduction apparatus, including a CD or MD player, which are required to be thin.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-000927 (filed on Jan. 7, 2003) which is expressly incorporated herein, by reference, in its entirety.

The invention claimed is:

1. An operating button device for a portable apparatus, said portable apparatus having a housing formed with an opening, said operating button device comprising:

a button that is disposed in said opening, said button having a first connecting portion and a second connecting portion formed at a different portion of said button than said first connecting portion, said first and second connecting portions being integrally formed with said button;

a spring member, integrally formed with said button, that is supported by a predetermined portion provided in said housing, said spring member being integrally connected to said first connecting portion;

a stopping claw, integrally formed with said button, that is connected to said second connecting portion, said stopping claw being configured to engage with an inner wall of said housing near a peripheral edge of said opening; and a switching circuit board that is provided in said housing and attached to an upper surface of a frame in said housing, said switching circuit board being depressed and released from being depressed through said button, said switching circuit board having a notch in which said stopping claw enters and abuts said frame when said button is depressed, said switching circuit board having a thickness direction oriented perpendicular to a width direction and to a longitudinal direction of said switching circuit board, said switching circuit board having first and second steps provided at opposing ends of said switching circuit board, wherein, said spring member does not extend, in the thickness direction, beyond said step of an end of said switching circuit board at which said spring member is positioned.

2. The operating button device according to claim 1, wherein said stopping claw is formed on a portion of said button, which is opposite to said spring member.

3. The operating button device according to claim 1, wherein said peripheral edge has a step, with which said stopping claw is engaged.

4. The operating button device according to claim 1, wherein said button has an elongated shape having two rounded ends, said first connecting portion being one of said rounded ends, and said second connecting portion being an other of said rounded ends.

5. The operating button device according to claim 1, wherein a rear surface of said button is provided with a projection configured to make contact with said switching circuit board.

6. The operating button device according to claim 5, wherein the distance by which said projection extends toward said switching circuit board is less than the distance by which said stopping claw extends toward said switching circuit board.

* * * * *